United States Patent
Nat

(10) Patent No.: US 6,822,130 B2
(45) Date of Patent: Nov. 23, 2004

(54) ISOMERIZATION CATALYST WITH A SPECIFIC PORE SIZE DISTRIBUTION

(75) Inventor: Pieter Jan Nat, Amsterdam (NL)

(73) Assignee: Akzo Nobel N.V., Arnhem (NL)

( * ) Notice: Subject to any disclaimer, the term of this patent is extended or adjusted under 35 U.S.C. 154(b) by 31 days.

(21) Appl. No.: 10/382,671

(22) Filed: Mar. 6, 2003

(65) Prior Publication Data

US 2003/0211937 A1 Nov. 13, 2003

(30) Foreign Application Priority Data

Mar. 6, 2002 (EP) .............................................. 02075903

(51) Int. Cl.$^7$ .......................... B01J 27/06; B01J 27/13; C07C 5/22; C07C 5/23; C07C 5/25

(52) U.S. Cl. ................... 585/482; 502/224; 502/230; 585/477; 585/480; 585/747; 585/748; 585/671; 585/664; 585/670

(58) Field of Search ................................ 502/224, 230; 585/477, 480, 482, 747, 748, 671, 664, 670

(56) References Cited

U.S. PATENT DOCUMENTS

| | | | |
|---|---|---|---|
| 3,723,556 A | 3/1973 | Wilhelm | |
| 4,069,269 A | 1/1978 | Pollitzer et al. | |
| 4,526,885 A | 7/1985 | Day et al. | 502/327 |
| 5,298,154 A | 3/1994 | Khare et al. | 208/139 |
| 6,150,296 A | * 11/2000 | Heinerman et al. | 502/152 |
| 6,194,345 B1 | * 2/2001 | Mangnus et al. | 502/224 |
| 6,350,715 B1 | * 2/2002 | Schuurhuis | 502/134 |

FOREIGN PATENT DOCUMENTS

| | | | | |
|---|---|---|---|---|
| GB | 1 432 639 | 4/1976 | | C07C/5/34 |
| WO | WO 97/197521 | 6/1997 | | B01J/31/14 |

OTHER PUBLICATIONS

European Search Report of Priority Appln. Ser. No. EP 02075903.1.

International Search Report of corresponding PCT/EP 03/02217, dated Jun. 6, 2003.

* cited by examiner

*Primary Examiner*—Elizabeth D. Wood
(74) *Attorney, Agent, or Firm*—Louis A. Morris

(57) ABSTRACT

A catalyst composition comprising an alumina carrier, a Group VIII noble metal, and a halogen compound wherein the catalyst composition has total pore volume of more than 0.48 ml/g and wherein at least 50% of this total pore volume resides in pores with a diameter smaller than 12 nm. This catalyst composition has a higher activity in isomerization reactions, per gram of catalyst and per gram of Group VIII noble metal, than prior art catalyst compositions.

17 Claims, No Drawings

ISOMERIZATION CATALYST WITH A SPECIFIC PORE SIZE DISTRIBUTION

BACKGROUND OF THE INVENTION

1. Field of the Invention

The present invention relates to a catalyst composition suitable for isomerization reactions, which composition comprises an alumina carrier, a Group VIII noble metal, and a halogen compound. The invention further relates to the use of this catalyst composition.

2. Prior Art

Known isomerization catalysts comprising an alumina carrier, a Group VIII noble metal, and a halogen compound are the commercial grades AT-20 and AT-2G available from Akzo Nobel Chemicals B.V. These catalysts comprise Pt and chloride on an alumina support and have a total pore volume of 0.45 ml/g. Of this total pore volume 91% resides in pores with a diameter smaller than 12 nm. The compacted bulk density of these compositions is 0.84 g/ml.

The object of the present invention is to provide an improved catalyst composition suitable for use in isomerization. More specifically, the objective is to provide a catalyst composition with a higher activity in isomerization reactions, per gram of catalyst and per gram of Group VIII noble metal, than the prior art catalyst compositions.

SUMMARY OF THE INVENTION

In one embodiment, the present invention comprises a catalyst composition comprising an alumina carrier, a Group VIII noble metal, and a halogen compound wherein the catalyst composition has total pore volume of more than 0.48 ml/g and wherein at least 50% of this total pore volume resides in pores with a diameter smaller than 12 nm.

In a second embodiment, the present invention comprises a process for the isomerization of hydrocarbons comprising contacting the hydrocarbons with the above catalyst composition at isomerization conditions.

Other embodiments of the invention comprise further details concerning catalyst composition and pore size.

DETAILED DESCRIPTION OF THE INVENTION

The total pore volume and the pore size distribution are measured by mercury porosimetry. This technique is based on the penetration of mercury into a porous material at selected pressures.

The sample to be measured is dried at 200° C. and subsequently placed in an apparatus where the sample is evacuated and immersed in mercury. The pressure is increased gradually, causing the mercury to intrude into the pores. The pore diameter (D) intruded is inversely proportional to the applied pressure (p) and given by the Washburn equation: $D = -4 \gamma \cos \theta / p$, wherein $\gamma$ is the surface tension, taken to be 480 dynes/cm, and $\theta$ is the contact angle, taken to be 140°.

The sample is contained in a so-called penetrometer, which has a sample cup (5 cc) attached to a capillary stem of precision bore glass filled with mercury. As the pressure is progressively increased up to 4,000 bar, pores of diminishing diameter are filled with mercury according to the Washburn equation. With this method the pore volume in pores with diameters ranging from 3.6 to 8,000 nm is measured.

The total pore volume of the sample is the total amount of mercury penetrated into the sample. From the relation between the pressure (and thus: the pore diameter) and the volume of penetrated mercury, the percentage of the total pore volume in pores with a diameter below 12 nm can be calculated.

The total pore volume of the catalyst composition according to the invention is preferably at least 50 ml/g, more preferably at least 0.55 ml/g, and most preferably at least 0.60 ml/g. On the other hand, the total pore volume preferably is not higher than 0.90 ml/g, more preferably not higher than 0.80 ml/g, even more preferably not higher that 0.75 ml/g, and most preferably not higher than 0.70 ml/g.

The percentage of the total pore volume residing in pores with a diameter smaller than 12 nm preferably is at least 65%, more preferably at least 75%, and most preferably at least 80%. The maximum percentage of the total pore volume residing in pores with a diameter smaller than 12 nm is 100%, preferably 95%, and most preferably 90%.

The alumina carrier preferably takes the form of particles, which are obtained by means of, e.g., extrusion, pelletising, beading, or by some other known method. The particles' shape may vary. Suitable shapes include spheres, cylinders, rings, and symmetric or asymmetric polylobes, such as trilobes and quadrulobes. Generally, the particles will have a diameter in the range of 1 to 10 mm and a length which is also in the range of 1 to 10 mm.

Suitable aluminas include active aluminas such as gamma-alumina, eta-alumina, theta-alumina, and mixtures thereof. Gamma-alumina is particularly preferred. The carrier preferably has a surface area of 100–500 $m^2/g$ and an average pore diameter of 2–20 nm.

It is especially preferred that the alumina carrier contains less than 800 ppm $TiO_2$ (based on total dry weight of the alumina carrier after heating for 1 hour at 1000° C.), more preferably less than 500 ppm, even more preferably less than 300 ppm, and most preferably less than 100 ppm. It has surprisingly been found that the isomerization activity of the catalyst composition according to the invention can be further improved by using alumina carriers with such a low content of $TiO_2$.

The $TiO_2$ content in the alumina carrier is determined by Inductively Coupled Plasma Atomic Emission Spectrometry (ICP-AES), after heating the alumina carrier for 1 hour at 1000° C. in air. In Atomic Emission Spectrometry, light emitted by excited atoms (or ions) is measured for wavelength and intensity. The emission occurs when sufficient energy is available to excite a free atom or ion to an unstable energy state. For each element a characteristic set of wavelengths is emitted when the atom or ion returns to a more stable electronic state, usually the ground state. The intensities of the spectral lines are related to the concentration of the various elements in the excitation source and therefore can be used for a quantitative determination of these elements.

In ICP-AES, the usual source of atomization and excitation is an argon plasma. A sample solution is nebulized in a stream of argon, which is subjected to a powerful and rapidly oscillating electromagnetic field. The plasma has a temperature of about 8,000 K. This high temperature causes complete atomization and excitation of the elements present in the plasma. The spectra emitted by the excited atoms or ions are complicated and very rich in lines. Therefore, sorting and identification of the various elements requires the use of a monochromator system with a resolution of about 0.015 nm or better. The adjustment of the monochromator to a certain wavelength is controlled by a micro-computer, which is also used for the data collection and the required calculations.

The Group VIII noble metal may be selected from the group of ruthenium, rhenium, palladium, osmium, iridium, and platinum, with preference being given to platinum, palladium, and mixtures thereof. The final catalyst preferably contains 0.01–2 wt. % of the Group VIII noble metal, calculated as metal and based on the weight of the final catalyst, more preferably 0.05 to 1 wt. %. Other metal components may also be present in the catalyst composition if so desired. Examples of other metal components which may influence the activity, selectivity or stability of the catalyst are tin, lead, germanium, bismuth, cobalt, nickel, indium, gallium, zinc, uranium, thallium, zirconium, and mixtures thereof.

The catalyst composition according to the invention is preferably prepared by means of the following steps:

(a) depositing a Group VIII noble metal compound on an appropriate alumina carrier, resulting in a precursor material 1, (b) incorporating a hydrocarbon-substituted aluminium compound into the precursor material 1 to form a precursor material 2, and (c) activating the precursor material 2 in a gas stream comprising $H_2$ and/or inert gas at a temperature above 400° C.

The Group VIII noble metal compounds can be deposited on the alumina carrier in any manner known in the art.

For example, one can start by preparing carrier particles by shaping the carrier precursor to form particles and calcining the resulting particles. The carrier particles can then be impregnated with a solution comprising a soluble salt or complex of the Group VIII noble metal or metals. Suitable salts or complexes are, e.g., chloroplatinic acid, platinum dichloride, and/or platinum tetrachloride hydrate. Additional components can be added to the solution to stabilise the solution or to influence the distribution of the metal over the alumina carrier. For example, if a homogeneous platinum distribution is desired, a strongly acidic solution, such as a solution containing chloroplatinic acid, HCl, and $HNO_3$, is commonly used. After impregnation, the alumina carrier may be calcined.

On the other hand, it is also possible to mix compounds of the Group VIII noble metal or metals with an alumina carrier precursor, shape the mixture to form particles, and finally calcine the particles.

If so desired, the Group VIII noble metal component present on the alumina carrier may be reduced, e.g., by passing hydrogen over the composition at a temperature in the range of 100 to 600° C.

A hydrocarbon-substituted aluminium compound is incorporated into precursor material 1 in a manner known in the art to form precursor material 2. The hydrocarbon-substituted aluminium compound can be incorporated into precursor material 1 in an amount of 0.05 to 0.20 mole of hydrocarbon-substituted aluminium compound per mole of carrier. The incorporation can be performed by impregnating precursor material 1 with a solution of the hydrocarbon-substituted aluminium compound, followed by removal of the solvent. Preferably, the boiling point of this solvent is not too high, since it is harder to remove high-boiling solvents from the composition. Suitable solvents include pentane, hexane, heptane, etc. It should be noted in this context that the removal of the solvent from the solution prior to activating step (c) is not always required. One possible alternative is to evaporate the solvent during the activating step. Of course, the feasibility of this option is dependent upon the nature of the solvent and the other process conditions.

The hydrocarbon-substituted aluminium compound is either a halide or a non-halide.

An example of a suitable hydrocarbon-substituted aluminium halide is a compound satisfying the formula $AlX_yR1_nR2_m$, wherein X is a halogen atom, R1 and R2 are the same or different and are selected from alkyl groups or aryl groups having 1–12 carbon atoms, y has the value 1 or 2, and n and m have the value 0 or 1, with the sum of y, n, and m being 3. X may be selected from fluorine, chlorine, bromine, and iodine, and is preferably chlorine. R1 and R2 may be selected from, e.g., methyl, ethyl, isopropyl, butyl, phenyl, cyclohexyl, etc. Suitable hydrocarbon-substituted aluminium halides include diethyl aluminium chloride, methyl aluminium dichloride, ethyl aluminium dichloride, and isobutyl aluminium dichloride. It should be noted that the hydrocarbon-substituted aluminium halide also may be a mixture of various hydrocarbon-substituted aluminium halides or a complex, for instance an alkyl aluminium sesquichloride.

An example of a suitable non-halide hydrocarbon-substituted aluminium compound is a compound satisfying the formula $AlR1R2R3$, wherein R1, R2, and R3 are the same or different and are selected from alkyl groups or aryl groups having 1–12 carbon atoms, such as described above. Examples of non-halide hydrocarbon-substituted aluminium compounds include triethyl aluminium and isobutyl diethyl aluminium. Mixtures of various non-halide hydrocarbon-substituted aluminium compounds may also be used.

If so desired, one may also apply a combination of one or more hydrocarbon-substituted aluminium halides with one or more non-halide hydrocarbon-substituted aluminium compounds.

Activation step (c) comprises heating precursor material 2 in a gas stream at a temperature above 400° C., preferably in the range of 400 to 1,000° C., more preferably 400–800° C., most preferably 600–750° C. The activation is carried out by contacting the catalyst with the gas stream over a period of 15 minutes to 5 hours, preferably of 30 minutes to 3 hours.

The gas stream comprises an inert gas, e.g. nitrogen or argon, and/or hydrogen. The gas stream preferably holds less than 10 ppm of water and less than 10 ppm of oxygen or oxygen-containing components.

When the hydrocarbon-substituted aluminium compound is a non-halide hydrocarbon-substituted aluminium, precursor material 2 should be contacted with a halogen-containing compound, preferably a chlorine-containing compound, before and/or during the activation treatment of step (c). For instance, it is possible to first contact precursor material 2 with a halogen-containing compound at a temperature in the range of 0 to 800° C., preferably in the range of 50 to 250° C., and then activate the catalyst in the hydrogen and/or inert gas-containing gas stream at a temperature in excess of 400° C. It is also possible to carry out the activation step (c) in a gas stream comprising (i) the halogen-containing compound and (ii) an inert gas and/or hydrogen.

When the hydrocarbon-substituted aluminium compound is a hydrocarbon-substituted aluminium halide, contacting of precursor material 2 with a halogen-containing compound before and/or during the activation treatment is not necessary, although the use of a halogen-containing compound generally leads to catalyst compositions with a somewhat higher activity.

Examples of suitable halogen-containing compounds are hydrogen halides, such as hydrogen chloride, halogen gases, and halogenated hydrocarbons, such as carbon tetrachloride, chloroform, chloroethane, etc. Hydrogen halides, particularly HCl, are generally preferred. If the activation step (c) is carried out in a gas stream comprising a halogen-containing compound and inert gas and/or hydrogen, the molar ratio of the halogen-containing compound to hydrogen and/or inert gas preferably is in the range of 0.1 to 10, more particularly in the range of 1 to 5.

The final catalyst preferably contains 0.2–15 wt. %, more preferably 2–15 wt % , and most preferably 3–7 wt % of halogen compound (calculated as halogen and based on the weight of the final catalyst), preferred halogen compounds being chlorine compounds.

The final catalyst composition preferably has a Compacted Bulk Density (CBD) below 0.84 g/ml, more preferably between 0.40 and 0.80 g/ml, and most preferably between 0.50 and 0.70 g/ml.

The CBD is determined by filling a 250 ml cylinder with a diameter of 5 cm an known weight with catalyst particles. The cylinder is filled until nearly full using a funnel with a diameter of 18 cm, a stem of 10 cm in length, and an internal diameter of 2.5 cm, placed 2 cm above the top of the cylinder. The cylinder is tapped with a spatula, while the cylinder itself taps against the table at the same time. Filling and tapping of the cylinder is repeated until the cylinder is full and the level of catalyst particles is constant. Excess of sample is wiped off with a ruler in such a way that the cylinder remains filled. The weight of the particles in the filled cylinder is measured and divided by the volume of the cylinder to obtain the CBD.

The catalyst according to the invention is suitable for use in a variety of hydrocarbon conversion processes. It can, for example, be used in the isomerization of aromatic and aliphatic hydrocarbons, more particularly in the isomerization of n-paraffins having 4 to 12 carbon atoms. It is also suitable for isomerising mixtures of different n-paraffins and mixtures of n-paraffins and aromatic hydrocarbons. The catalyst according to the invention shows particularly favourable results in the isomerization of $C_4$, $C_5/C_6$, and $C_7$ paraffins.

Preferably, the feedstock to be isomerised contains at least 50 wt. % of paraffins. The feedstock may contain olefins, but preferably less than 10%, because the presence of olefins leads to increased hydrogen consumption. As is known in the art, the feed should be relatively free of sulphur components and water, because these materials act as catalyst poisons. The feed generally contains up to 1 ppm of sulphur and up to 0.5 ppm of water.

The isomerization process can be performed by contacting the catalyst with an oil (hydrocarbon) feed in a fixed bed at isomerization conditions, which include the presence of hydrogen at a temperature in the range of 80 to 330° C., preferably of 100 to 200° C. The pressure in the isomerization reactor generally is in the range of 1 to 60 bar, preferably 2 to 40 bar, with the LHSV ranging from 0.5 to 40 $h^{-1}$, preferably from 1 to 20 $h^{-1}$. The molar ratio of hydrogen to oil feed preferably is in the range of 0.005 to 10, more preferably 0.01 to 5. As those skilled in the art will know, a minute amount of a halogen-containing compound may be incorporated into the oil feed in order to extend the life of the catalyst. Thus, 0.001 to 1 wt. %, calculated as halogen, of a hydrogen halide, a halogen gas, and/or a halogenated hydrocarbon (such as carbon tetrachloride, chloroform, chloroethane, chloroisopropane, etc.) may be added to the feed.

In addition, the catalyst according to the invention can be used for the alkylation of alkylatable aromatic or aliphatic hydrocarbons by contacting the compound to be alkylated with an alkylating agent at a suitable temperature and pressure in the presence of the catalyst. Alkylating reactions are known to those skilled in the art and require no further elucidation here.

Other reactions in which the catalyst according to the invention can be used are the dimerization and oligomerization of olefins.

EXAMPLES

General Preparation Procedure

About 1,000 g of gamma-alumina extrudates were contacted for a period of 4 hours with an aqueous solution containing chloroplatinic acid (25% platinum). The Pt-concentration in this solution depended on the desired Pt-load of the catalyst. Next, the extrudates were dried at 120° C. for 16 hours and calcined at 550° C. for 1.5 hours to form precursor material 1.

306 g of precursor material 1 were transferred to a round-bottom flask, the reactor was evacuated, and 256 g of a 20 wt. %-ethyl aluminium dichloride solution in heptane were added. This addition took 30 minutes. During the final 10 minutes of this addition, the temperature was 60° C. Next, the liquid was drained from the round-bottom flask and any remaining liquid was evaporated at a temperature of 135° C. under a nitrogen flow of 1,300 ml/min. The resulting product was the precursor material 2.

The precursor material 2 was then heated to 680° C. in a 5% hydrogen and 95% nitrogen flow (total flow: 2,000 ml/min). After one hour of activating at 680° C. using the same hydrogen/nitrogen flow, the product was cooled to room temperature to complete the preparation of the catalyst.

The pore volumes of the alumina carrier and the resulting catalyst were determined by mercury porosimetry in the way described above using an Micrometrics Autopore VI 9500 V1.05.

The $TiO_2$ content of the alumina carrier was measured in the way described above using a Perkin-Elmer Plasma Optima 3000 XL, operated with a 40 MHz RF generator and provided with a dual view option (meaning that the plasma can be viewed axially as well as radially), a Cetac U 5000+ ultrasonic nebuliser, a Perkin-Elmer As-90 Autosampler, and a standard personal computer to control the instrument and to handle the acquired data.

General Test Procedure

A test reactor was filled with 26 ml of crushed catalyst. Air was excluded from the reactor. The temperature was then increased to 160° C. and a mixture of oil feed and hydrogen was passed over the catalyst, producing a product stream. The hydrogen content in the product stream was 3 mole %, the pressure was 30 bar, and the space velocity was 2.0 g of oil feed per g of catalyst per hour. A commercial oil feed was used comprising 37 wt. % of normal pentane, 42.5 wt. % of normal hexane, 9.5 wt. % of cyclohexane, and 5.5 wt % of benzene.

The TIN (total isomerization number) was used as a measure of the activity of the catalyst. This number can be obtained from $INC_5$ and $INC_6$ by means of the following formulae:

$$INC_5 = \frac{iC_5}{iC_5 + nC_5} \times 100$$

$$INC_6 = \frac{2.2\ DMB}{2.2\ DMB + 2.3\ DMB + 2\ MP + 3\ MP + nC_6} \times 100 \text{ and}$$

$$TIN = INC_5 + INC_6$$

wherein the symbols iC5, nC5, 2.2 DMB, 2.3 DMB, 2 MP, 3 MP, and nC6 represent the content (in wt %) in the product stream of:
iC5=isopentane
nC5=normal pentane
2.2 DMB=2,2-dimethyl butane
2.3 DMB=2,3-dimethyl butane
2 MP=2-methyl pentane
3 MP=3-methyl pentane
nC6=normal hexane Example 1

Four different catalysts were prepared according to the general preparation procedure: catalysts A, B, C, and D. Catalysts A and C are based on gamma-alumina extrudates with a total pore volume of 0.50 ml/g; catalysts B and D were based on gamma-alumina extrudates with a total pore volume of 0.58 ml/g. The specifications of the final catalysts are outlined in Table I. From this Table it is clear that catalysts B and D are according to the invention.

TABLE I

|  | Catalyst A | Catalyst B | Catalyst C | Catalyst D |
|---|---|---|---|---|
| Pt (wt %) | 0.260 | 0.238 | 0.192 | 0.237 |
| CBD (g/ml) | 0.84 | 0.68 | 0.84 | 0.68 |
| Diameter extrudate (mm) | 1.5 | 1.6 | 1.5 | 1.5 |
| Length extrudate (mm) | 4.5 | 5.8 | 4.5 | 5.8 |
| Total PV of catalyst (ml/g) | 0.45 | 0.56 | 0.45 | 0.56 |
| % of total PV below diameter of 12 nm | 91 | 86 | 91 | 86 |
| $TiO_2$ in carrier (ppm) | 30 | 30 | 30 | 1000 |

Example 2

The isomerization behaviour of catalysts A, B, and C was tested according to the general test procedure.

In these experiments the test reactor was filled with 26 ml of catalyst. Due to the the lower bulk density of catalyst B, the mass of catalyst B in the reactor was lower than the mass of catalysts A and C (see Table II). Due to the different Pt-content of the catalysts, the reactors filled with catalysts B and C contained about the same amount of Pt, which was lower than that in the reactor filled with catalyst A.

TABLE II

|  | Catalyst A | Catalyst B | Catalyst C |
|---|---|---|---|
| Catalyst volume (ml) | 26 | 26 | 26 |
| Catalyst mass (g) | 20.5 | 16.6 | 20.5 |
| Pt-mass (mg) | 53.3 | 39.5 | 39.4 |
| TIN (%) | 94.7 | 95.2 | 66.3 |
| Benzene formation (wt %) | 0.00 | 0.00 | 0.85 |

If the results of catalysts A and C are compared, it is clear that a decrease in Pt-content in the reactor through simply using a catalyst impregnated with a smaller amount of Pt results in a decrease in catalytic activity. Apart from this decreased activity, unwanted benzene formation occurred during the reaction over catalyst C.

Surprisingly, however, the results of catalysts A and B show that a decrease in Pt-content in the reactor as a result of a lower bulk density of the catalyst—this lower bulk density resulting from the higher total pore volume—did not result in an activity decrease. In fact, the activity slightly increased. Moreover, no benzene was formed.

These experiments show that the catalyst composition according to the invention has a higher activity per gram of catalyst and per gram of Pt than catalyst compositions with a lower total pore volume.

Example 3

Catalysts B and D were tested according to the procedure of Example 2. The results are shown in Table III.

TABLE III

|  | Catalyst B | Catalyst D |
|---|---|---|
| Catalyst volume (ml) | 26 | 26 |
| Catalyst mass (g) | 16.6 | 16.5 |
| Pt-mass (mg) | 39.6 | 39.4 |
| TIN (%) | 95.2 | 44.0 |
| Benzene formation (wt %) | 0.00 | 0.00 |

These results show that a catalyst composition with total pore volume of more than 0.48 ml/g with at least 50% of this total pore volume in pores smaller than 12 nm and containing less than 800 ppm of $TiO_2$ has a higher activity than the same catalyst containing more than 800 ppm of $TiO_2$.

What is claimed is:

1. Catalyst composition comprising an extruded alumina carrier, a Group VIII noble metal, and a halogen compound wherein the catalyst composition has a total pore volume of more than 0.48 ml/g and wherein at least 50% of this total pore volume resides in pores with a diameter smaller than 12 nm, and wherein the compacted bulk density is below 0.84 ml/g.

2. The catalyst composition of claim 1 wherein the total pore volume is at least 0.50 ml/g.

3. The catalyst composition of claim 2 wherein the total pore volume is at least 0.55 ml/g.

4. The catalyst composition of claim 1 wherein the total pore volume is not higher than 0.90 ml/g.

5. The catalyst composition of claim 1 wherein at least 65% a of the total pore volume resides in pores with a diameter smaller than 12 nm.

6. The catalyst composition of claim 1 wherein at least 80% of the total pore volume resides in pores with a diameter smaller than 12 nm.

7. The catalyst composition of claim 1 wherein the Group VIII noble metal is present in an amount of 0.01–2 wt %, calculated as metal and based on the weight of the catalyst composition.

8. The catalyst composition of claim 7 wherein the Group VIII noble metal is present in an amount of 0.05–1 wt %, calculated as metal and based on the weight of the catalyst composition.

9. The catalyst composition of claim 1 wherein the Group VIII noble metal is platinum and/or palladium.

10. The catalyst composition of claim 1 wherein the halogen compound is a chlorine compound.

11. The catalyst composition of claim 1 wherein the halogen compound is present in an amount of 2–15 wt %, calculated as halogen and based on the weight of the catalyst composition.

12. The catalyst composition of claim 1 wherein the alumina carrier contains less than 800 ppm of $TiO_2$, based on the weight of he alumina carrier.

13. The catalyst composition of claim 12 wherein the alumina carrier contains less than 500 ppm of $TiO_2$, based on the weight of the alumina carrier.

14. The catalyst composition of claim 13 wherein the alumina carrier contains less than 100 ppm $TiO_2$, based on the weight of the alumina carrier.

15. A process for the isomerization of aromatic and aliphatic hydrocarbons comprising contacting said hydrocarbons with the catalyst composition of claim 1 at isomerization conditions.

16. Catalyst composition comprising an alumina carrier, a Group VIII noble metal, and a halogen compound wherein the catalyst composition has a total pore volume of more than 0.48 ml/g and wherein at least 80% of this total pore volume resides in pores with a diameter smaller than 2 nm, and wherein the compacted bulk density is below 0.84 ml/g.

17. A process for the isomerization of hydrocarbons comprising contacting said hydrocarbons with the catalyst composition of claim 16 at isomerization conditions.

* * * * *